United States Patent Office 3,450,544
Patented June 17, 1969

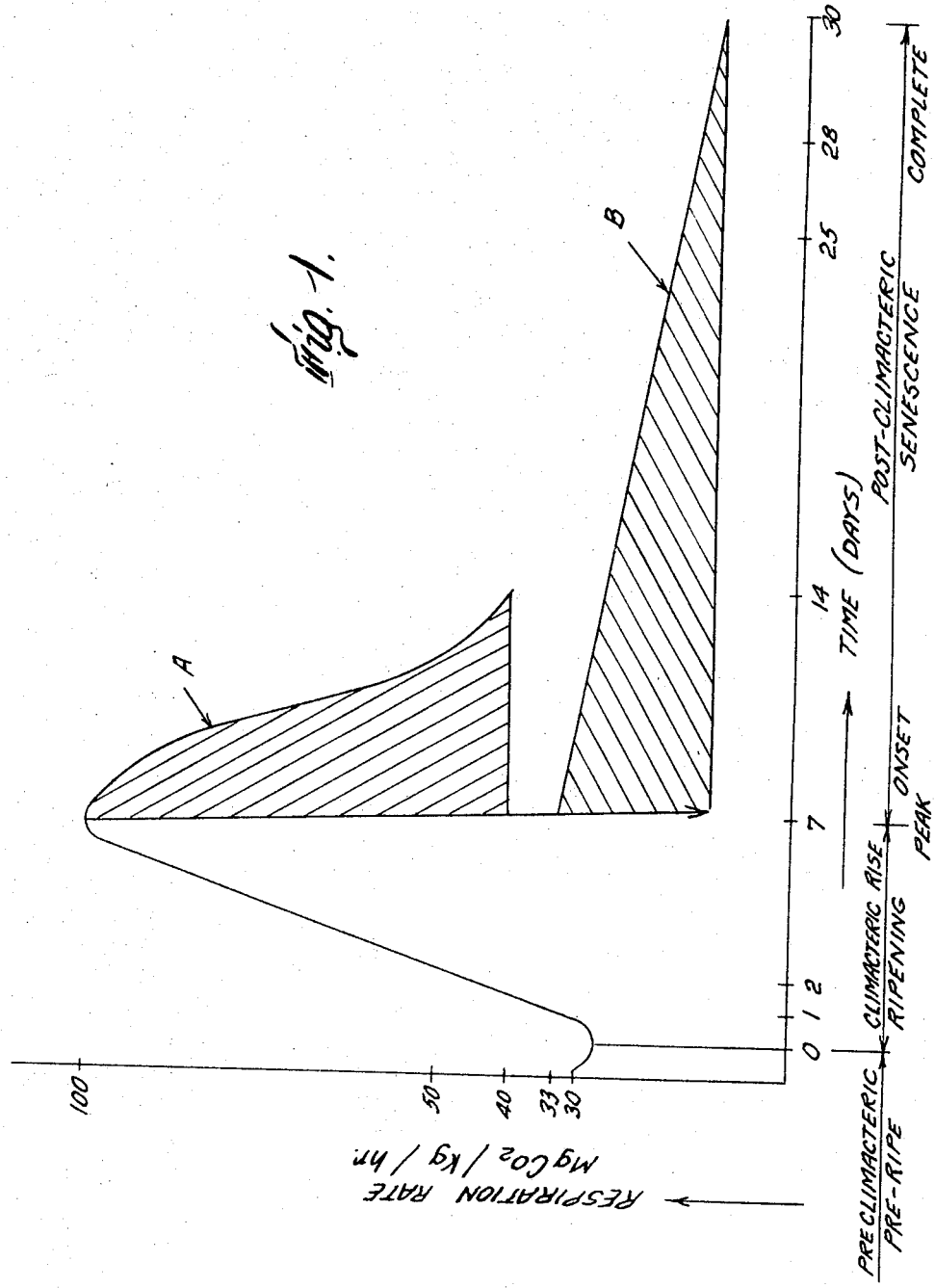

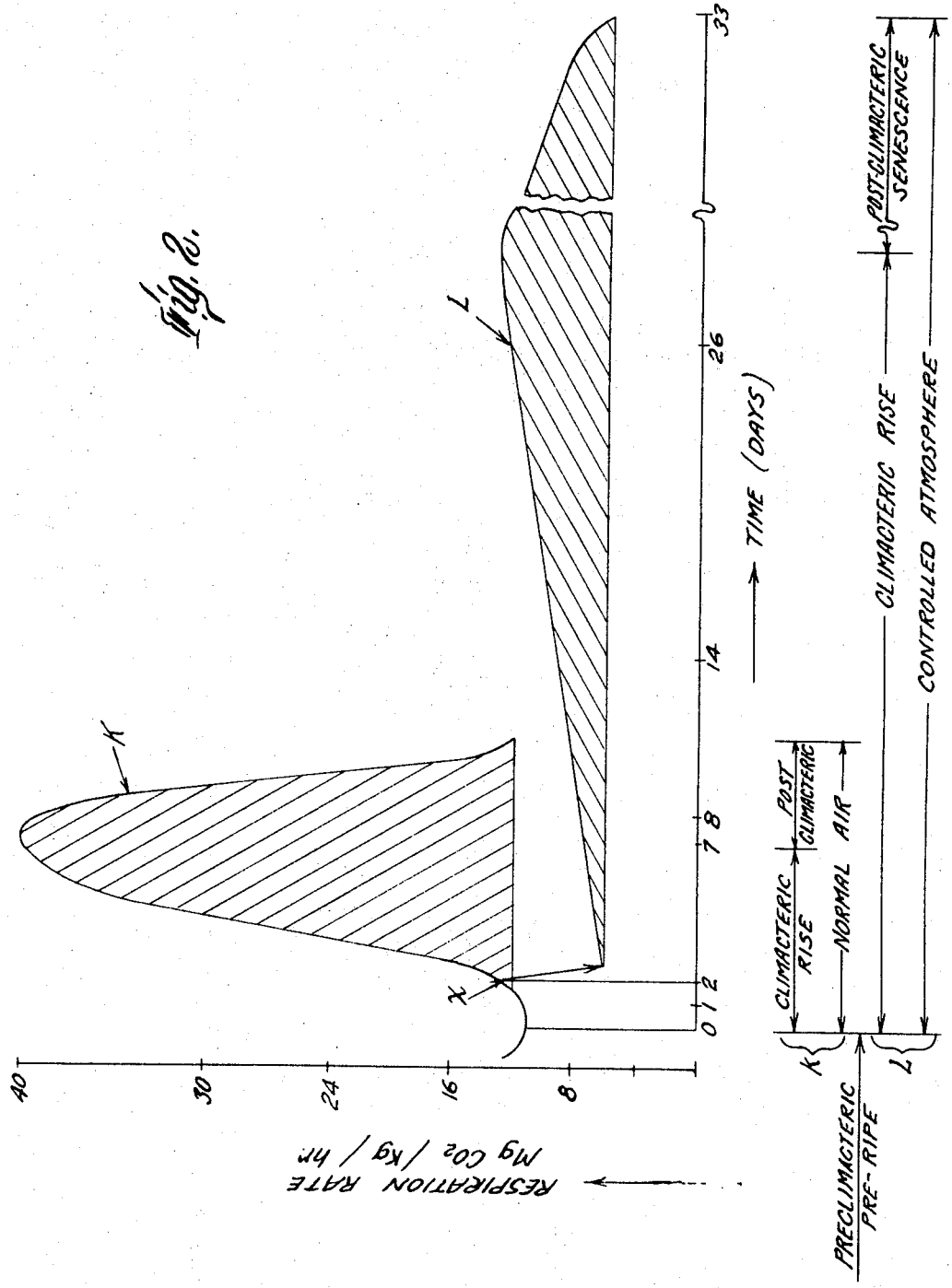

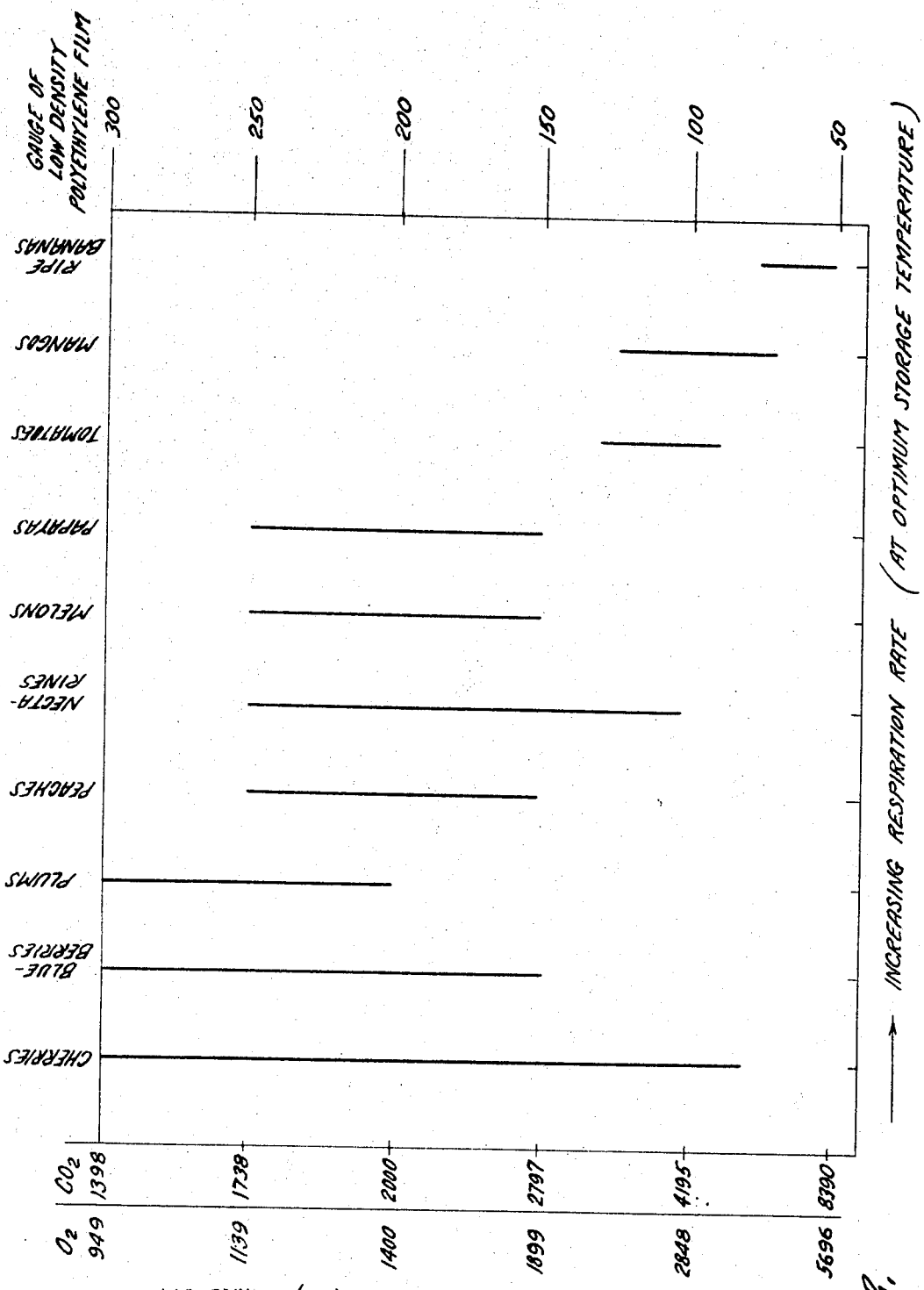

3,450,544
METHOD OF PACKAGING RIPENING PERISHABLE PLANT FOODS TO PROLONG STORAGE LIFE
Adnan M. Badran, Richard E. Woodruff, and Lorenzo George Wilson, La Lima, Honduras, assignors to United Fruit Company, Boston, Mass., a corporation of New Jersey
Filed Jan. 10, 1966, Ser. No. 519,697
Int. Cl. B65b 55/00
U.S. Cl. 99—171  11 Claims

ABSTRACT OF THE DISCLOSURE

Perishable plant foods which pass through a climacteric peak of respiration within seven days after the onset of their climacteric rise in respiration have their respiration rate reduced by placing them in a gas permeable flexible film which is sealed subsequent to the onset of the climacteric rise in respiration but prior to the onset of senescence whereby a reduced $O_2$ content is present, thus restricting $CO_2$ production until an equilibrium is reached so that the produced $CO_2$ escapes through the gas permeable film substantially at the same rate as it is produced.

---

This invention relates to the storage of plant foods which, in the ripening process, proceed through a climacteric stage evidenced by a sharp rise in the rate of respiration, and specifically to the storage of that class of such foods which are regarded as being perishable and exemplified by such nondeciduous fruits as tomatoes, blueberries, mangos, melons and papaya and by pit-bearing fruit of deciduous trees such as peaches, nectarines, plums and cherries.

The term perishable foods is hereinafter used to encompass that class of foods which ripen under conditions of exposure to atmospheric air at temperatures above freezing and up to and including room temperature to a point of complete senescence causing rejection by the average consumer within a period of 30 days from harvesting. Such fruits in the climacteric respiratory class generally have an interval between the onset and the peak of climacteric rise in respiration at room temperature in normal air of seven days or less.

It has been known to the art that nonpit-bearing fruits of deciduous trees which can anyway be stored for relatively long periods of time, e.g., upwardly of 30 days at refrigerated tempertaures, may have their storage life further prolonged by utilizing a controlled surrounding atmosphere imparted by enclosing the produce in a permeable film such as polyethylene (see U.S. Patent No. 2,611,709 and French Patent No. 1,240,044). While such fruits, namely apples and pears exhibit a climacteric rise in respiration, such rise is relatively slow time-wise—there being an interval of much more than 7 days even at room temperature between the onset of and peak of the climacteric—rendering them nonperishable as this term is herein used. Presence of controlled atmosphere during initial shipping to warehouses is hence not essential.

Where a controlled atmosphere is induced by food metabolism and the use of a gas permeable sealed film enclosure, efforts to hold perishable fruits other than bananas, for example, tomatoes, melons, mangos, papayas, at a preclimacteric green stage have not proved successful. While established controlled atmospheres appear to maintain such perishable fruits in their preclimacteric stages upon unsealing the package with exposure to air or other normal ripening atmosphere, these fruits fail to ripen properly, wholly unlike green bananas. In some way which cannot be fully explained at the present time, controlled atmosphere storage conditions disrupt the respiratory system of normal ripening.

It has now been found that with the use of properly chosen kinds and amounts of imperforate but gas permeable sealed film enclosures, storage of these other climacteric perishable plant foods can successfully be prolonged provided that the produce is sealed within the film enclosure at a particular stage of ripening whereat the respiration rate of the produce is sufficiently high to cause a rapid reduction in oxygen in the particular enclosure, thereby promptly modifying the characteristic atmospheric air's climacteric curve of respiration rate. In order that this curve shall be properly modified to extend the period of ripening, it is essential that the internal oxygen content be rapidly lowered, but not exhausted. While this may readily be done in the case of rigid storage rooms by preparing the gaseous mixture of $O_2$ and $CO_2$ and preflushing the cabinet therewith prior to placing the food in the cabinet, a produce merely sealed in a film package requires a period of time in which to reach an internal gaseous equilibrium. If this equilibrium, particularly containing a low $O_2$ content, for example, less than 8%, is not rapidly attained in the case of these perishable foods, the climacteric rise in respiration may proceed during the period required to reach the equilibrium at such a rapid rate that storage is not materially prolonged. As can be seen, however, in the case of such nonperishable foods as apples and pears, since the overall ripening period may be something of the order of ninety days, the establishment of a low oxygen content at almost any point during the first ninety days may prolong the storage period at least to a certain extent. In the case of perishable food, however, which may complete its ripening in a 5-day period, a controlled atmosphere becomes of most value if it is established as near the beginning of the 5-day period as possible.

For the above reasons, and in accordance with this invention, one does not rely solely on isolating a load of perishable produce from the surrounding atmosphere beneath or within a permeable imperforate film. Rather one resorts, in addition to sealing a manually portable load within an $O_2$ and $CO_2$ permeable flexible enclosure, to a step which reduces the total $O_2$ contained within the enclosure at the time of sealing to an amount which is less than that which would be present in the loaded sealed container were it to contain its full volumetric capacity of normal atmospheric air. This can be achieved by, just prior to or while sealing, charging the enclosure with an atmosphere of lowered $O_2$ tension, or partially flushing the enclosure with an inert gas, but is most conveniently done, in accordance with this invention, by removing excess contained air from the enclosure before sealing by loading the perishable commodity under atmospheric conditions into an enclosure in the form of an open-mouthed bag constituted of flexible film and then momentarily holding the mouth of the bag over a suction head to cause the bag to collapse around and into a configuration conforming to the external contour of the enclosed produce load. Similar withdrawal of internal air can be accomplished by immersing the bag in an incompressible fluid, such as water, while its mouth is open to the atmosphere, or by otherwise subjecting the bag to a differential outside pressure to exhaust excess air through the open mouth before sealing. No matter how accomplished, this exhaustion step is not intended to substantially lower the pressure in the bag as by drawing a vacuum, since any strong vacuum treatment is undesirble and unnecessary. The function of the exhaustion is rather to extract most of the air from the bag while leaving the remainder at substantially atmospheric pressure. In this manner, the amount of remaining internal $O_2$ immediately available to the commodity for respiration consumption is so restricted that reduction in the percentage content of enclosed $O_2$ is very rapid, thus decreasing the rate of metabolism so quickly, due to the lowered $O_2$ tension, that build up of $CO_2$ within the enclosure by exhalation from the produce during the period for reaching an $O_2$ equilibrium is not so great as to exceed a permissible minimum after taking into account the amount of $CO_2$ that will escape depending upon the particular $CO_2$ permeability of the enclosing sheet material. Increasing rate of $O_2$ flow into the bag as the $O_2$ tension decreases, however, insures that the $O_2$ content will not go below that required to prevent suffocation of the enclosed produce, provided the area of the permeable sheet is adequate, as it is in the case of a collapsed bag.

Thus, instead of taking any such amount of time as two weeks to have the oxygen tension within the enclosure halve as in French Patent No. 1,240,044, the $O_2$ tension, in enclosures of this invention, is reduced to less than half its original tension in a period usually not exceeding six hours.

The signifiant feature of this invention then is correlating the amount of initial enclosed $O_2$ to the weight and hence to the oxygen demand per hour of the enclosed produce load such that the $O_2$ initially present, when taken with a six-hour ingress of $O_2$ through the film at the developing $O_2$ internal partial pressures and prevailing temperature, is so much less than the load's six-hour oxygen demand under normal atmospheric conditions, that, at the end of the six-hour period, an internal $O_2$ tension less than one half the original 20–21% $O_2$ tension of normal air, and usually less than 8% oxygen tension, will have been established. Stabilization of the internal atmosphere at a substantially low level of $O_2$ tension usually takes place within a matter of 12 hours and oftentimes in 1 hour or less depending upon the particular enclosed food.

The invention hereof can thus be characterized as involving the packaging of plant foods which exhibit a climacteric rise in respiration in an imperforate manually portable size enclosure whose walls are formed in whole or in part of a flexible sheet material which is reversely permeable to $O_2$ and $CO_2$ under conditions of partial pressures of said gases on opposite sides of said material, while sealing the food in the enclosure at the peak or along the rise of its climacteric curve of respiration with a sealed-in quantity of $O_2$ gas which is materially less than would be contained in air occupying the full volumetric capacity of that portion of the enclosure which is undisplaced by the food, in order to reduce the initial enclosed $O_2$ quantity, per unit weight of the enclosed food whether by reduction in $O_2$ tension, or by restriction in the quantity of air at atmospheric $O_2$ tension, or both to a level insufficient, when taken with any concomitant ingress of $O_2$ through the permeable film, to satisfy more than one half of the $O_2$ demand of the enclosed produce at the temperature of storage over the first few hours of residence, whereby the internal $O_2$ tension will preferably not exceed 8% after the first 12 hours of residence, the film being so chosen that at the level of metabolic activity and temperature prevailing during the 12-hour period, unescaping $CO_2$ will not accumulate in the enclosure to a level exceeding 10%.

FIG. 1 is a graph showing a roughly typical, but not intended to be exact, respiration curve A of a climacteric food during storage at 50° F. in normal air. The zero point in time just prior to the onset of a climacteric rise is the post-harvest low point in respiration. As the climacteric is triggered, the $CO_2$ production rapidly increases to a climacteric peak after 7 days. In a typical case as shown by the graph, the milligrams of $CO_2$ produced by the produce may increase from 30 milligrams to a peak of 100 milligrams. Thereafter senescence begins accompanied by a steadily increasing breakdown of carbohydrates at a steadily decreasing rate until complete senescence occurs typically at the end of 14 days.

Packaging of climacteric produce of the type referred to in this application at any time before the climacteric rise, i.e., before the zero point in the graph, has not been found to result in satisfactory storage life. Sealing the produce at any preclimacteric stage appears to disrupt the ripening cycle and when the package is opened, after any period of storage, the fruit fails to ripen in accordance with its normal cycle. It is essential, therefore, to package the produce *after* the onset of the climacteric and preferably in most cases as nearly as possible to the peak of the climacteric but prior to the onset of senescence so that the oxygen demand of the enclosed produce will consume oxygen from the interior of the bag at the highest possible initial rate so as to reduce the oxygen content to an equilibrium within a period of not more than 6 hours, illustrated by the arrow line extending down from the peak in FIG. 1. Reduction of the $O_2$ content to say less than 5% results in the respiration rate going to ⅓ or about 33 mg. $CO_2$/kg./hr. and thereafter over a period of 28 days gradually falling to a point of complete senescence (Curve B). In an ideal case, the total quantity of $CO_2$ released by the produce within the sealed enclosure over the period of 21 days confinement will be substantially equivalent to that which would be released by the produce in a period of 7 days if not packaged. The shading below curves A and B is intended to indicate the equivalence of these two quantities in term of carbohydrates breakdown.

The graph of FIG. 2 shows similar curves relating to the specific produce tomatoes. In this case, tomatoes exposed to atmospheric conditions have a very steep curve K of senescence due probably to the fact that most of the carbohydrate has been broken down during the climacteric rise. Accordingly, if tomatoes are packaged at the climacteric peak, there will be so little carbohydrate left in the tomatoes to be oxidized during the storage period that it is very difficult to stretch the senescence curve over a period as much as 21 days. In order to overcome this difficulty, in the case of tomatoes, the sealing is done *after* the onset of the climacteric but well down on the curve of climacteric rise (at X in FIG. 2) when a large part of the carbohydrates still remain to be oxidized. As a result it has been found that the climacteric rise curve is modified substantially as shown in FIG. 2 by the curve L so that the climacteric peak is much lower and delayed so that the curve of senescence reaches a period of 30 or more days from sealing.

FIG. 3 is a bar chart generally illustrating how in the case of various climacteric produce the thickness of desirable useful films of given permeability decreases for produce having increasing respiration rates. Each bar represents the range of useful permeability for a given product. In addition, there is shown for each permeability the gauge of a low density polyethylene corresponding to that permeability, namely one having a permeability to $O_2$ of about 2848 cc., and to $CO_2$ of about 4195 cc., both per mil per 100 square inches per 24 hours at STP (0° C., 760 mm. of Hg), as measured substantially in accordance with the procedures described in Journal of Applied Polymer Science, volume 7, pages 2035–2051, 1963. Gauge is the mil thickness multiplied by 100.

In FIG. 3 the produce is listed from left to right generally in the order of increasing respiration rates in normal air. As can be seen, film thicknesses which are perfectly suitable for low respiration produce such as cherries, blueberries and plums are entirely unsuitable for produce such as tomatoes, mangos and ripe bananas. Conversely, thicknesses of 250 to 300 gauge and above can be useful for cherries, blueberries and plums but are wholly unsuitable for the other products.

Thus the bar chart illustrates the absolute necessity of correlating the overall permeability of the film to the respiration rate of the enclosed weight of produce at the storage temperature. Otherwise, in the case of high-respiring produce, accumulation of $CO_2$ in too thick enclosures will upset the equilibrium and cause suffocation or pickling. Conversely, if the film is too thin, the oxygen content within the sealed enclosure will remain too high and fail to delay complete senescence.

All plant food is susceptible to injury by exposure to $CO_2$ in too high percentages, particularly at low $O_2$ level even at optimum storage temperatures. The exact sub-injurious maximum varies depending upon the particular food and therefore preferably should be taken into account in fixing the various variables of thickness, permeability and film area to enclosed food weight ratio so as to insure that the $CO_2$ level will not rise during the period of storage above the permissible maximum for the particular food. Thus, for example, melons and mangos tolerate $CO_2$ contents as high as 14% whereas such foods as tomatoes will not tolerate much in excess of 7.5%.

Where normal atmospheric air is included at the time of sealing, though in restricted quantity in accordance with this invention, no substantial part of the enclosure wall should have such rigidity that it cannot collapse against the solid content. Otherwise, the exhaustion step fails to accomplish its purpose.

Also, if the entire enclosure surface is not gas permeable, sufficient thereof must be permeable, for best storage life, to permit the internal atmosphere to become stabilized, after an equilibrium-reaching period, through a correlation between the total ingress of $O_2$ with the total $O_2$ consumed by the food and between the total egress of $CO_2$ with the total $CO_2$ exhaled by the food. In general, enclosure wall areas having the above permeabilities should exist in an amount of at least one square inch in single thickness per each .003–.008 kilogram of contained food, but generally the more compact the contents and the greater their density, the less the area of the film relative to the enclosed weight, and also the quicker the equilibrium can be established because of the less $O_2$ remaining in the bag at the time of sealing.

Films as used herein also have low rates of vapor transmission of only about 1.2 cc. per 24 hours per 100 sq. in. per mil at 100° F. and hence retain within the sealed enclosures both free water and water formed as a metabolic reaction product with the result that the relative humidity remains close to 100%, thereby minimizing weight loss of the produce by desiccation and reducing growth of those fungi which still thrive on desiccated tissue despite their already suppressed activity due to the controlled atmosphere.

While films as used in this invention have low rates of vapor transmission, they do transmit nonaqueous volatiles, emanating from the food, as the result of partial pressure differential with the atmosphere surrounding the enclosure; and thereby such volatiles are automatically removed from the environment before their concentration becomes high enough to adversely affect the flavor and quality of the produce.

As can be seen, the modified atmospheres of gas and humidity in sealed enclosures of this invention are established and maintained endogenously, i.e., solely by virtue of the differential partial pressures of gases developed inside and outside of the permeable sheet material as a result of respiration of the enclosed food. This is in contrast to the present day exogenous methods of supplying externally generated $CO_2$ and $O_2$ to a chamber to establish and maintain controlled atmosphere.

Other gas permeable plastic films such as pliofilm, polypropylene, polystyrene, cellulose acetate and vinyl films which have suitable gas permeabilities due to the presence of specific plasticizers or otherwise and also possess the other essential physical characteristics provided by polyethylene, can equally well be used, though in their present commercial forms they do not generally have as high $O_2$ diffusion rates as low density polyethylene, and therefore would have to be used in such thinness as to raise their $CO_2$ permeability too high, and with less tensile strength than is desirable as rupture cannot be countenanced.

The following are examples of practice in accordance with this invention as to the products referred to in FIG. 3.

EXAMPLE I.—TOMATOES

Mature green tomatoes are perishable foods whose storage period at 58° F. in normal air is accepted as being only from about 14 to 28 days. They are climacteric and their oxygen demand is in the order of 21 milligrams of $O_2$ per kilogram tomatoes per hour at 58° F. (Agriculture Handbook No. 66, U.S. Department of Agriculture, September 1954).

Tomatoes weighing approximately 0.8 kilogram were placed in an open-mouthed bag of polyethylene film of varying thicknesses from 75 to 300 gauge having a permeability to $O_2$ of about 2848 cc. and to $CO_2$ of about 4195 cc. per mil per 100 square inches per 24 hours at STP as determined by the above referred to test. Prior to sealing each bag about 250.6 cc. of air were exhausted, leaving within the sealed bags about 134 cc. of air which contained $O_2$ in the amount of 33.5 cc. $O_2$ per kilogram of enclosed tomatoes. The bags had an internal area of 176 square inches which allowed a ratio of 1 square inch of film to each 0.0044 kilogram tomatoes.

After 2 hours at 58–60° F., the sealed 130 gauge enclosure was sampled for its $O_2$ and $CO_2$ content and found to be 7.8% $O_2$ and 3.8% $CO_2$ as compared to its original content of 21% $O_2$ and .03% $CO_2$.

The sealed packages were stored at 58–60° F. for a period of three weeks, taking weekly $CO_2$ and $O_2$ readings of the internal atmosphere. The results are shown in the following table:

| Film Gauge | Days in Storage | | | | | | | |
|---|---|---|---|---|---|---|---|---|
| | 7 | | 14 | | 21 | | Mean | |
| | Percent $CO_2$ | Percent $O_2$ | Percent $CO_2$ | Percent $O_2$ | Percent $CO_2$ | Percent $O_2$ | Percent $CO_2$ | Percent $O_2$ |
| 75 | 3.2 | 7.4 | 3.0 | 6.4 | 3.8 | 1.8 | 3.3 | 5.2 |
| 80 | 3.8 | 6.4 | 3.6 | 5.0 | 3.8 | 6.4 | 3.7 | 5.9 |
| 100 | 3.8 | 6.2 | 3.2 | 6.0 | 4.0 | 4.6 | 3.7 | 5.6 |
| 125 | 3.4 | 9.0 | 3.0 | 7.4 | 7.2 | 3.8 | 4.5 | 6.7 |
| 130 | 4.0 | 3.4 | 3.4 | 5.2 | 4.0 | 4.6 | 3.8 | 4.4 |

Since 125–130 gauge had proven to be an exceptionally good film in earlier studies one more package of this gauge was held for 4 weeks with less than 5% rots and minimal color development. The atmosphere in the bag was 4.6% $CO_2$ and 5.2% $O_2$.

At the expiration of three weeks, the tomatoes were sound and had advanced only slightly in color, showing some pink and red. In some cases a rotting tomato had to be eliminated from the pack, but the remainder of the fruits were in excellent condition. Shelf life of post-CA tomatoes was extended 1 week. These were compared with control tomatoes stored at the same temperature in normal air, the latter having shrivelled and advanced in ripeness to a pink to red color within two weeks, the fruits had lost their turgidity and become dull in appearance making any further handling impossible. The best films for longest storage period appeared to be those in the range of 75 to 130 gauge.

Tomatoes in 150 and 200 or higher film ranges maintained its mature green stage and ripened properly only when they were exposed to normal air not later than 1–2 weeks in bags. Tomatoes in lower film gauges advanced in color but very slowly during 3–4 weeks.

Tests with pink tomatoes at 45° F. did not show very promising results, nor did those tests with ripe tomatoes at 50° F. Rots and molds develop on the fruits as soon or, in some cases, sooner than the unbagged tomatoes.

EXAMPLE II.—MELONS

Mature melons are a highly perishable food whose storage period at 40–45° F. in normal air is accepted as being only 4–8 days. They are climacteric fruit and their oxygen demand is in the order of 10 milligrams of $O_2$ per kilogram per hour at 45° F.

Melons weighing about 0.786 kilogram each were placed in open-mouthed bags of polyethylene film of varying thicknesses from 80 to 300 gauge having a permeability as in Example I. Prior to sealing each bag about 144 cc. of air were exhausted leaving within the sealed bags 55 cc. of air which contained $O_2$ in the amount of about 14.0 cc. of $O_2$ per kilogram of enclosed melon. The bags had an internal area of 187 square inches which allowed a ratio of 1 square inch diffusable film per 0.0042 kilogram enclosed melon.

After 3 hours at 45° F., the sealed 200 gauge enclosure was sampled for its $O_2$ and $CO_2$ content and found to be 6.8% $O_2$ and 4.3% $CO_2$ as compared to its original content of 21% $O_2$ and .03% $CO_2$.

Sealed packages of melons were stored at 45° for five weeks taking weekly readings of the internal atmospheres. The results of films which maintained the most desirable atmospheres of $O_2$ and $CO_2$ are shown in the following table.

oxygen demand is in the order of 4.5 milligrams of $O_2$ per kilogram of cherries per hour at 32° F.

Cherries weighing approximately 1 kilogram were placed in an open-mouthed bag of polyethylene film of varying thicknesses from 75 to 300 gauge having a permeability as in Example I. Prior to sealing each bag, 246 cc. of air were exhausted, leaving within the sealed bags 409 cc. of air which contained $O_2$ in the amount of 81.8 cc. $O_2$ per kilogram of enclosed cherries. The bags had an internal area of 105 square inches which allowed 1 square inch of diffusible film membrane per 0.006 kilogram of respiring confined cherries.

The sealed packages were stored at 32° F. for a period of six weeks, taking periodical readings of the internal atmosphere. The results are shown in the following table:

| | Days in Storage at 32° F. | | | | | | | | | | | |
|---|---|---|---|---|---|---|---|---|---|---|---|---|
| | 14 | | 21 | | 28 | | 35 | | 42 | | Mean | |
| Film Gauge | Percent $CO_2$ | Percent $O_2$ | Percent $CO_2$ | Percent $O_2$ | Percent $CO_2$ | Percent $O_2$ | Percent $CO_2$ | Percent $O_2$ | Percent $CO_2$ | Percent $O_2$ | Percent $CO_2$ | Percent $O_2$ |
| 75 | 1.4 | 17.0 | 2.8 | 10.0 | 4.8 | 3.2 | 4.0 | 7.2 | 5.0 | 13.0 | 3.7 | 10.0 |
| 100 | 4.6 | 4.0 | 4.4 | 4.2 | 5.4 | 3.2 | 5.6 | 2.8 | 5.4 | 11.6 | 5.0 | 5.2 |
| 125 | 3.8 | 5.4 | 4.6 | 4.8 | 4.8 | 5.6 | 4.2 | 5.2 | 3.8 | 12.0 | 4.2 | 6.6 |
| 150 | 4.8 | 7.4 | 5.6 | 5.8 | 6.2 | 2.0 | 5.4 | 1.6 | 5.2 | 13.0 | 5.4 | 5.9 |
| 200 | 7.4 | 2.2 | 7.0 | 1.8 | 7.6 | 1.2 | 7.2 | 1.6 | 6.8 | 10.8 | 7.2 | 3.5 |
| 250 | 5.0 | 3.4 | 6.8 | 2.2 | 7.4 | 1.4 | 6.6 | 1.2 | 5.6 | 12.6 | 6.3 | 4.1 |
| 300 | 9.6 | 2.6 | 7.4 | 5.0 | 9.6 | 2.8 | 8.6 | 3.6 | 9.6 | 8.2 | 8.7 | 4.4 |

At the expiration of 6 weeks the sweet cherries were sound and fresh in appearance with only 5–10% of the fruit showing no more than trace to light rots or molds. The fruit held in 125–300 gauge packages appeared to be slightly firmer and better in appearance than the others. Also characterized by greener appearance of stems. Otherwise all fruit was in excellent condition compared with the control packages of sweet cherries stored at the same temperature in normal air, the latter having shrivelled and rotted and become desiccated and lost their fresh turgid appearance within two weeks; the fruit was soft and unmarketable.

In general, cherries stored in higher gauge films were slightly firmer than those stored in lower gauge films,

| | Days in Storage at 45° F. | | | | | | | | | | | |
|---|---|---|---|---|---|---|---|---|---|---|---|---|
| | 7 | | 14 | | 21 | | 28 | | 35 | | Mean | |
| Film Gauge | Percent $CO_2$ | Percent $O_2$ | Percent $CO_2$ | Percent $O_2$ | Percent $CO_2$ | Percent $O_2$ | Percent $CO_2$ | Percent $O_2$ | Percent $CO_2$ | Percent $O_2$ | Percent $CO_2$ | Percent $O_2$ |
| 150 | 5.0 | 3.5 | 6.9 | 4.3 | 10.0 | 4.0 | 14.0 | 1.3 | 8.4 | 1.0 | 8.8 | 2.8 |
| 200 | 9.3 | 3.2 | 10.5 | 4.6 | 15.4 | 4.6 | 17.0 | 2.8 | 10.2 | 1.4 | 12.5 | 3.3 |
| 250 | 12.0 | 3.0 | 12.3 | 5.3 | 15.6 | 4.5 | 18.0 | 2.5 | 16.4 | 4.4 | 14.9 | 3.9 |

At the expiration of four weeks at 45° F. the melons packed in 150 through 300 gauge polyethylene films were in a sound condition. Melons in 150 and 200 gauge films had only traces of surface mold growth but were firm and taste was normal. Melons in 250 and 300 gauge were also sound and firm but off-flavors had developed. Melons in 80 through 130 gauge developed severe rots and surface mold growth after four weeks storage.

At the expiration of five weeks all melons packed in the various films had objectionable amounts of rots and molds and were in an unmarketable condition.

The control melons had developed severe rots and molds after two weeks storage; the melons were soft and in an unmarketable condition.

Melons were packed at ½-full slip stage of maturity during these tests. For optimum storage period, melons require higher level of $CO_2$ in the atmospheric composition of the enclosure to control breakdown, mold and rots to which melons are quite susceptible.

EXAMPLE III.—CHERRIES

Cherries are perishable foods whose storage period at 32° F. in normal air is accepted as being only from about 10 to 14 days. They are climacteric food and their primarily due to more suppressing level of respiration via atmospheres of higher $CO_2$ and lower $O_2$ levels.

While not recommended, sweet cherries were stored at 45° F. in similar sealed packages for a period of three weeks. At the expiration of three weeks the cherries were fresh, but not quite as turgid as those held at 32° F. for this same period of time. Five to 10% of the fruit showed trace to light rots and molds, but with minimal culling all fruit was marketable. The 200–300 gauge samples had freshest stems. These were compared with control sweet cherries stored at the same temperature in normal air, the latter having shrivelled, become desiccated and lost their fresh, turgid appearance in less than two weeks; the fruit was unmarketable.

EXAMPLE IV.—BLUEBERRIES

Blueberries are a highly perishable food whose storage period at 32° F. in normal air is accepted as being only from about 14 to 21 days. They are climacteric plant material and their oxygen demand is in the order of 4.5 cc. of $O_2$ per kilogram blueberries per hour at 32° F.

Blueberries weighing approximately 0.755 kilogram were placed in an open-mouthed bag of polyethylene of varying thicknesses from 80 to 300 gauge having a permeability as in Example I. Prior to sealing each bag, about 242 cc. of air were exhausted, leaving within the sealed bags about 238 cc. of air which contained $O_2$ in the amount of 63 cc. $O_2$ per kilogram of enclosed blueberries. The bags had an internal area of 165 square inches. The internal surface area of diffusible film membrane confining the contents was 1 square inch per 0.0039 kilogram of enclosed respiring blueberries.

The sealed packages were stored at 32–34° F. for a period of eight weeks taking periodic $O_2$ and $CO_2$ readings of the internal atmosphere. The results of films which maintained the most desirable atmospheric composition of $O_2$ and $CO_2$ are shown in the following table:

| Film Gauge | Days in Storage at 32° F. | | | | | | | | | | | | |
|---|---|---|---|---|---|---|---|---|---|---|---|---|---|
| | 7 | | 14 | | 21 | | 28 | | 46 | | 53 | | Mean | |
| | $CO_2$ | $O_2$ | $CO_2$ | $O_2$ | $CO_2$ | $O_2$ | $CO_2$ | $O_2$ | $CO_2$ | $O_2$ | $CO_2$ | $O_2$ | $CO_2$ | $O_2$ |
| 125 | 3.6 | 8.6 | 2.8 | 2.6 | 3.4 | 8.6 | 3.0 | 9.2 | 4.0 | 12.6 | 3.6 | 7.0 | 3.4 | 8.1 |
| 150 | 3.2 | 9.2 | 3.0 | 2.8 | 3.2 | 11.2 | 3.0 | 14.8 | 4.6 | 5.8 | 3.6 | 8.8 | 3.4 | 8.8 |
| 200 | 4.0 | 10.4 | 2.8 | 4.4 | 3.8 | 7.0 | 3.6 | 7.8 | 5.4 | 9.2 | 4.4 | 8.2 | 4.0 | 7.8 |
| 250 | 5.0 | 7.0 | 4.0 | 3.2 | 4.2 | 7.4 | 3.4 | 8.2 | 4.8 | 7.2 | 4.2 | 7.2 | 4.3 | 6.9 |
| 300 | 4.8 | 7.6 | 5.8 | 2.2 | 5.6 | 4.6 | 6.8 | 5.0 | 6.6 | 3.4 | 6.4 | 4.8 | 6.0 | 4.7 |

At the expiration of eight weeks, the blueberries stored in 150–300 gauge polyethylene were fresh, turgid and nearly free of rots and molds. Overall condition of the blueberries packed in 250 to 300 gauge film was slightly better than blueberries in 150 and 200 gauge polyethylene because of better freshness. These were compared with control blueberries stored at the same temperature in normal air, the latter having wilted, shrunk and lost their bloom within 2 to 3 weeks; the berries had lost their turgidity and become raisin-like in appearance and commercially unmarketable.

EXAMPLE V.—PAPAYA

Papayas are highly perishable foods whose storage period in normal air is accepted as being only 7 to 21 days. They are climacteric plant material and their oxygen demand is in the order of 10 cc. of $O_2$ per kilogram per hour at 60° F.

Papayas weighing about 3.2 kilograms were placed in open-mouthed bags of polyethylene film of varying thicknesses from 125 to 250 gauge having a permeability as in Example I. Prior to sealing each bag about 660 cc. of air were exhausted leaving within the sealed bags about 200 cc. of air which contained $O_2$ in the amount of about 12.5 cc. $O_2$ per kilogram of enclosed papayas. The internal surface area of film confining the contents was 1 square inch per .0064 kilogram of enclosed papayas.

Sealed packages of ripe papayas were stored at 45° F. for a period of 2 weeks in two separate tests. Measurements of $CO_2$ and $O_2$ inside the bags were as follows after 2 weeks storage:

| Polyethylene gauge | Percent $CO_2$ | | Percent $O_2$ | |
|---|---|---|---|---|
| | Test #1 | Test #2 | Test #1 | Test #2 |
| 125 | 3.4 | 4.5 | 5.0 | 6.3 |
| 150 | 6.3 | 6.0 | 3.1 | 5.3 |
| 200 | 5.2 | 7.2 | 3.4 | 3.0 |
| 250 | 6.0 | 11.8 | 3.3 | 2.0 |

Ripened papayas remained in good condition through 2 weeks of storage in all film gauges. After this period rots and molds became excessive and the fruit was in an unmarketable condition. Control papayas stored in normal air having rotted and deteriorated to an unmarketable condition after 2–3 days.

Sealed packages of mature turning papayas were stored at 60° F. for two weeks taking $CO_2$ and $O_2$ measurements of the internal atmospheres after 2 weeks.

| Film Gauge | Percent $CO_2$ | Percent $O_2$ |
|---|---|---|
| 125 | 4.3 | 6.0 |
| 150 | 5.0 | 5.2 |
| 200 | 6.8 | 3.5 |
| 250 | 9.8 | 2.1 |

Mature turning papayas did not advance in ripeness through two weeks of storage at 60° F. in any of the film thicknesses. Some rots and molds developed, however, on papayas in 125 and 150 gauge film. Papayas in 200 and 250 gauge film were in excellent condition and rot and mold free. These were compared to control papayas stored in normal air at the same temperature. The papayas advanced in ripeness and rots and molds were excessive so that the fruit was unmarketable. Papayas stored in polyethylene films were ripened at 80° F. with ethylene to a solid orange color within 3–4 days. Rots were minimal on papayas stored in 200 and 250 gauge polyethylene but excessive on papayas held in 125 and 150 gauge films. All papayas ripened to good flavor and aroma.

EXAMPLE VI.—PEACHES

Peaches are perishable food and not adapted to cold storage. However, if they are sound and well-matured but not overripe, they can be held at 32° F. for 2 to 4 weeks. They are climacteric fruit and their oxygen demand is in the order of 5.5 milligrams $O_2$ per kilogram per hour at 32° F.

Matured but not overripe peaches weighing approximately 0.739 kilogram were placed in an open-mouthed bag of polyethylene of varying thicknesses from 75–300 gauge having a permeability as in Example I. Prior to sealing each bag, about 363.5 cc. of air were exhausted, leaving within the sealed bags about 177.5 cc. of air which contained $O_2$ in the amount of 48 cc. $O_2$ per kilogram of enclosed peaches. The bag had an internal area of 176 square inches. This area allowed 1 square inch of the diffusible film membrane per 0.0042 kilogram of respiring confined peaches.

After 6 hours at 32° F., the sealed 200 gauge enclosure was sampled for its $O_2$ and $CO_2$ content and found to be 9.0% $O_2$ and 2.4% $CO_2$ as compared to its original content of 21% $O_2$ and .03% $CO_2$.

The sealed packages were stored at 32° F. for a period of six weeks taking periodic $O_2$ and $CO_2$ readings of the internal atmosphere. The results of films which maintained the most desirable atmospheric composition of $O_2$ and $CO_2$ are shown in the following table:

| Film Gauge | Days in Storage at 32° F. | | | | | | | | | | | | | |
|---|---|---|---|---|---|---|---|---|---|---|---|---|---|---|
| | 7 | | 14 | | 21 | | 28 | | 35 | | 42 | | Mean | |
| | Percent $CO_2$ | Percent $O_2$ | Percent $CO_2$ | Percent $O_2$ | Percent $CO_2$ | Percent $O_2$ | Percent $CO_2$ | Percent $O_2$ | Percent $CO_2$ | Percent $O_2$ | Percent $CO_2$ | Percent $O_2$ | Percent $CO_2$ | Percent $O_2$ |
| 75 | 4.0 | 5.6 | 4.0 | 3.8 | 4.4 | 3.2 | 4.2 | 1.6 | 4.0 | 13.6 | 4.0 | 9.4 | 4.1 | 6.0 |
| 100 | 5.6 | 2.8 | 5.2 | 3.4 | 4.8 | 3.0 | 5.0 | 1.2 | 5.0 | 4.2 | 6.2 | 5.4 | 5.3 | 4.3 |
| 130 | 6.0 | 3.4 | 4.2 | 6.0 | 4.6 | 3.8 | 6.2 | 2.2 | 6.0 | 6.0 | 7.0 | 2.6 | 5.7 | 3.0 |
| 150 | 4.6 | 7.0 | 6.8 | 2.8 | 5.2 | 3.8 | 6.2 | 1.0 | 5.8 | 8.6 | 6.2 | 4.8 | 5.8 | 4.7 |
| 200 | 7.4 | 6.4 | 5.4 | 2.4 | 7.6 | 4.0 | 6.4 | 1.0 | 6.4 | 2.4 | 6.4 | 2.0 | 6.6 | 2.0 |
| 250 | 7.0 | 1.8 | 5.4 | 1.6 | 6.0 | 2.6 | 5.6 | 1.6 | 6.0 | 2.8 | 7.0 | 1.4 | 9.0 | 2.5 |
| 300 | 10.2 | 3.8 | 11.2 | 2.2 | 9.4 | 1.6 | 6.8 | 1.4 | 7.0 | 4.2 | 9.6 | 1.8 | | |

Storaging peaches was successful under all film gauges after 2 weeks holding period. Fruits stored in 150–250 film gauge were maintained fresh, firm and bright in appearance and free of mold or decay for 6 weeks. These were compared with control lots of peaches stored at the same temperature in normal air, the latter having wilted and shrunk, and lost their natural bright color within two weeks. Control peaches became dry and mealy or else wet and mushy and showed browning of the flesh around the stone after 2 weeks. They were attacked by rots and molds. Peaches stored in film gauges below 150 started to soften and dry up after 2 weeks; they lost their flavor and bright color after 3 weeks. Peaches stored in film gauges higher than 250 were maintained very hard and ripening was retarded semicompletely after 4 weeks. 150–250 seems to be the optimum film gauge over the longest storage duration of 6 weeks.

Test with storaging peaches at 45° F. showed good results only for a maximum period of 10 days.

EXAMPLE VII.—NECTARINES

Nectarines are perishable foods not adapted to cold storage. However, if they are sound and well-matured but not overripe, they can be held at 32° F. for 2 to 4 weeks. They are climacteric foods and their oxygen demand is in the order of 5.5 milligrams of $O_2$ per kilogram per hour at 32° F.

Mature but not overripe nectarines weighing approximately 0.739 kilogram were placed in an open-mouthed bag of polyethylene of varying thicknesses from 75–300 gauge having a permeability as in Example I. Prior to sealing each bag, about 365.5 cc. of air were exhausted, leaving within the sealed bags about 177.5 cc. of air which contained $O_2$ in the amount of 48 cc. $O_2$ per kilogram of enclosed nectarines. The bag had an internal area of 176 square inches. This area allowed 1 square inch of the diffusible film membrane per 0.0042 kilogram of respiring confined nectarines.

After 6 hours at 32° F., the sealed 200 gauge enclosure was sampled for its $O_2$ and $CO_2$ content and found to be 9.8% $O_2$ and 1.5% $CO_2$ as compared to its original content of 21% $O_2$ and .03% $CO_2$.

The sealed packages were stored at 32° F. for a period of six weeks taking periodic $O_2$ and $CO_2$ readings of the internal atmosphere. The results of films which maintained the most desirable atmospheric composition of $O_2$ and $CO_2$ are shown in the following table:

32° F. Control nectarines stored at the same temperature under normal air softened at first week and shrivelled and became low quality and unmarketable at end of second week. Lost their bright color and flesh browning developed around the pits.

Tests on storage nectarines at higher temperature of 45° F. did not show good results further than two weeks. At this time only 75–130 gauge maintained good quality nectarines. Raising the temperature of produce during storage needed higher film permeability to correlate with higher respiring rate.

EXAMPLE VIII.—PLUMS

Fresh plums are perishable food and not stored extensively since they are not adapted to cold storage. The storage period at 32° F. is about 3 weeks. They are climacteric food and their oxygen demand is in the order of 10 milligrams $O_2$ per kilogram per hour at 32° F.

Plums weighing about 0.530 kilogram were placed in open-mouthed bags of polyethylene film of varying thicknesses from 75–300 gauge having a permeability as in Example I. Prior to sealing each bag about 228 cc. of air were exhausted leaving within the sealed bags about 105 cc. of air which contained $O_2$ in the amount of about 39.7 cc. $O_2$ per kilogram of enclosed plums. The bag had an internal area of 165 square inches or 1 square inch of the diffusible film membrane per 0.0032 kilogram of respiring confined plums.

After 5 hours at 32° F., the sealed 200 gauge enclosure was sampled for its $O_2$ and $CO_2$ content and found to be 9.0% $O_2$ and 3.1% $CO_2$ as compared to its original content of 21% $O_2$ and .03% $CO_2$.

The sealed packages were stored at 32° F. for a period of 5 weeks taking periodic $O_2$ and $CO_2$ readings of the internal atmosphere. The results of the most desirable atmospheric composition are shown in the following table:

| Film Gauge | Days in Storage at 32° F. | | | | | | | | | | | |
|---|---|---|---|---|---|---|---|---|---|---|---|---|
| | 7 | | 14 | | 21 | | 28 | | 35 | | Mean | |
| | Percent $CO_2$ | Percent $O_2$ | Percent $CO_2$ | Percent $O_2$ | Percent $CO_2$ | Percent $O_2$ | Percent $CO_2$ | Percent $O_2$ | Percent $CO_2$ | Percent $O_2$ | Percent $CO_2$ | Percent $O_2$ |
| 75 | 2.0 | 10.8 | 3.0 | 10.6 | 2.6 | 4.2 | 3.6 | 14.0 | 2.2 | 13.2 | 2.7 | 10.5 |
| 100 | 2.4 | 9.8 | 3.2 | 6.8 | 3.2 | 2.8 | 3.8 | 8.2 | 2.6 | 10.0 | 3.0 | 7.5 |
| 130 | 3.4 | 8.6 | 3.8 | 7.6 | 3.6 | 3.2 | 3.4 | 9.2 | 3.6 | 8.8 | 3.5 | 7.4 |
| 150 | 3.4 | 10.8 | 5.0 | 6.6 | 4.4 | 3.2 | 4.2 | 8.0 | 3.8 | 7.8 | 4.1 | 7.2 |
| 200 | 3.4 | 11.4 | 5.2 | 7.4 | 4.2 | 4.4 | 4.2 | 6.6 | 4.6 | 8.2 | 4.3 | 7.6 |
| 250 | 4.4 | 9.8 | 6.0 | 6.6 | 3.6 | 4.2 | 5.8 | 12.2 | 4.2 | 7.6 | 4.8 | 8.0 |
| 300 | 7.0 | 9.0 | 5.6 | 3.0 | 5.0 | 4.2 | 10.2 | 3.0 | 4.8 | 8.0 | 6.5 | 5.4 |

At the expiration of 3 weeks, plums stored under all gauges were maintained in good condition. At the expiration of 5 weeks, 200 gauge proved to be the best film. Fruit was fresh, bright and had a sweet good flavor. Sweetness increased under CA storage. Flesh was clean and no breakdown. Control plums stored at 32° F. in normal air became soft after 1 week and unmarketable at the end of 2 weeks; lost flavor, wilted and became shrunken similar to prunes in appearance.

| Film Gauge: | Days in Storage at 32° F. | | | | | | | | | | | | | |
|---|---|---|---|---|---|---|---|---|---|---|---|---|---|---|
| | 7 | | 14 | | 21 | | 28 | | 35 | | 42 | | Mean | |
| | Percent $CO_2$ | Percent $O_2$ | Percent $CO_2$ | Percent $O_2$ | Percent $CO_2$ | Percent $O_2$ | Percent $CO_2$ | Percent $O_2$ | Percent $CO_2$ | Percent $O_2$ | Percent $CO_2$ | Percent $O_2$ | Percent $CO_2$ | Percent $O$ |
| 100 | 4.2 | 3.2 | 2.8 | 7.8 | 5.0 | 2.0 | 4.0 | 7.6 | 4.0 | 5.8 | 4.6 | 3.0 | 4.1 | 4.9 |
| 130 | 4.8 | 4.8 | 4.4 | 4.0 | 6.0 | 2.0 | 5.2 | 6.0 | 4.8 | 7.2 | 5.2 | 6.0 | 5.0 | 5.0 |
| 150 | 5.4 | 1.8 | 5.8 | 2.6 | 7.0 | 1.2 | 4.2 | 5.0 | 4.4 | 7.8 | 5.0 | 3.8 | 5.3 | 3.7 |
| 200 | 6.4 | 4.6 | 4.4 | 9.6 | 7.0 | 2.0 | 5.4 | 6.6 | 9.2 | 2.8 | 5.8 | 4.2 | 6.3 | 4.9 |
| 250 | 3.6 | 8.8 | 6.0 | 7.6 | 8.2 | 2.0 | 5.0 | 9.4 | 7.2 | 7.6 | 6.0 | 4.4 | 6.0 | 6.6 |

Nectarines were maintained fresh, firm, free of rots and breakdown and in good flavor for 6 weeks in 100–150 gauge. At the end of 5 weeks nectarines in 100–250 gauge were comparable. Nectarines stored at higher gauge hardened and showed flat taste and mealy texture and those stored at lower gauges showed advanced ripening, softness and breakdown after three weeks storage at

EXAMPLE IX.—MANGOS

Mangos are perishable foods whose storage period in normal air is accepted as being only 2 to 3 weeks at 50° F. They are climacteric fruit and their oxygen demand is in the order of 28 milligrams $O_2$ per kilogram per hour at 50° F.

Mangos weighing approximately 2.7 kilograms were placed in an open-mouthed bag of polyethylene film of varying thicknesses from 75 to 150 gauge having a permeability as in Example I. Prior to sealing each bag, about 4020 cc. was exhausted leaving within the sealed bags about 942 or 70 cc. $O_2$ per kilogram of enclosed mangos. The internal surface area of film confining the contents was 1 square inch per 0.006 kilogram mangos.

After 1 hour at 50° F., the sealed 130 gauge enclosure was sampled for its $O_2$ and $CO_2$ content and found to be 3.3% $O_2$ and 4.5% $CO_2$ as compared to its original content of 21% $O_2$ and .03% $CO_2$.

The sealed packages were stored at 50° F. for a period of 4 weeks taking periodical $CO_2$ and $O_2$ readings of the internal atmosphere. The results are shown in the following table:

film confining the contents was 1 square inch per 0.008 kilogram bananas.

After 1 hour at 70° F., the 60 gauge sealed enclosure was sampled for its $O_2$ and $CO_2$ content and found to be 2.2% $O_2$ and 5.5% $CO_2$ as compared to its original content of 21% $O_2$ and .03% $CO_2$.

The sealed packages of ripe bananas were stored at 70° F. for a period of 8–10 days. Measurements of $O_2$ and $CO_2$ of the inside atmospheres were as follows:

| | Days at 70° F. | | | | | | | | | |
|---|---|---|---|---|---|---|---|---|---|---|
| | 2 | | 4 | | 6 | | 8 | | Mean | |
| Film Gauge | Percent $CO_2$ | Percent $O_2$ | Percent $CO_2$ | Percent $O_2$ | Percent $CO_2$ | Percent $O_2$ | Percent $CO_2$ | Percent $O_2$ | Percent $CO_2$ | Percent $O_2$ |
| 60 | 8.0 | 2.0 | 10.0 | 1.4 | 12.0 | 1.8 | 11.0 | 2.4 | 10.2 | 1.9 |

Ripe bananas were maintained fresh, firm and bright in color for 8–10 days in film gauges 50–75. Green color disappeared slowly and ripening advanced slightly. Crowns were fresh and there was no mold or rots development. These bananas were compared with control lot stored at the same temperature in normal air, the latter having advanced in senescence, softened and flecks ap-

| | Days in Storage at 50° F. | | | | | | | | | |
|---|---|---|---|---|---|---|---|---|---|---|
| | 7 | | 14 | | 21 | | 28 | | Mean | |
| Film Gauge | Percent $CO_2$ | Percent $O_2$ | Percent $CO_2$ | Percent $O_2$ | Percent $CO_2$ | Percent $O_2$ | Percent $CO_2$ | Percent $O_2$ | Percent $CO_2$ | Percent $O_2$ |
| 80 | 7.0 | 1.6 | 9.2 | 3.2 | 10.0 | 4.0 | 11.0 | 2.2 | 9.3 | 2.8 |
| 110 | 10.5 | 1.6 | 12.0 | 2.4 | 12.7 | 3.2 | 13.0 | 1.4 | 12.0 | 2.2 |
| 130 | 14.0 | 3.2 | 16.0 | 7.8 | 13.0 | 1.6 | 14.6 | 1.4 | 14.4 | 3.5 |

Mangos were held successfully for 4 weeks when they were placed in the sealed enclosure during the respiratory climacteric after color break. Fruit exhibited fresh appearance and was free from anthracnose fungus attack. Flavor in general was good. Flavor was best in enclosures which maintained $CO_2$ level not above 12%. Control mangos stored at the same temperature in normal air showed severe cases of anthracnose lesions, after 2 weeks storage. These mangos wilted and lost their bright appearance and firmness and became unmarketable within 2–3 weeks.

Mangos stored in this sealed system in the preclimacteric stage failed to proceed normally through the ripening cycle when they were exposed to normal air. Anthracnose attack was severe at a premature stage. Placing too-ripe mangos which have peaked climacterically in the sealed system was characterized by shorter storage life.

The shelf life of mangos was approximately doubled after exposing the fruit to normal air at 50° F. and omitting the gas atmosphere treatment. This extension of shelf was not as marked at 70° F.

EXAMPLE X.—RIPE BANANAS

Ripe bananas are extremely perishable food and cannot be held more than four days at 70° F. after they are ready for human consumption. The lowest temperature at which ripe bananas can safely be held to delay senescence is about 56° F., below this they become chilled and injury to the peel results. Bananas are climacteric food and their oxygen consumption ranges from 85 milligrams $O_2$ at the climacteric peak (yellow color more than green) down to 60 milligrams $O_2$ in the post-climacteric stage (total yellow color) per kilogram fruit per hour at 70° F.

Bananas at the climacteric peak (¾ yellow) weighing approximately 1.005 kilograms were placed in an open-mouthed bag of polyethylene film of varying thicknesses from 50 to 75 gauge having a permeability as in Example I. Prior to sealing each bag, 375 cc. of air were exhausted, leaving within the sealed bags 275 cc. of air which contained $O_2$ in the amount of 52 cc. $O_2$ per kilogram of enclosed bananas. The internal surface area of peared within 4 days. Control fruit lost their even yellow appearance and crowns were attacked severely by rots.

What is claimed is:

1. The method of packing perishable plant foods which, after harvest and during ripening, pass through a climacteric stage evidenced by an increasing rate of respriation rising to a peak of respiration occurring at room temperature in normal air within seven days of the onset of the climacteric, which includes the steps of inserting a manually portable weight of the harvested food at a stage of ripening subsequent to the onset of the climacteric rise in respiration but prior to the onset of senescene, into an imperforate enclosure formed, at least in part, of flexible gas-permeable plastic sheet material, having a permeability to $O_2$ of the order of 2848 cc. and to $CO_2$ of the order of 4195 cc., both per mil per 100 square inches per 24 hours at STP, and having a thickness from about 50–300 gauge, extracting excess air from the enclosure to collapse the sheet material into a configuration generally conforming to the exterior shape of adjacent portions of the enclosed food to establish a relatively fixed internal surface area of about one square inch of enclosing permeable material per .003–.008 kilogram of enclosed food and sealing the enclosure while it contains, in its collapsed form, a remaining air volume contacting the food which is less than the volumetric capacity of the uncollapsed enclosure minus the volume of enclosed solids, and which contains between about 12.5 and about 82 cc. of $O_2$ per kilogram of enclosed food to cause a reduced $O_2$ and elevated but subinjurious $CO_2$ atmosphere having less than one half its original $O_2$ content and not more than 10% $CO_2$ content to be established endogenously within said encloure within six hours of sealing and to be maintained thereafter around a mean between 1.4–10% $O_2$ and a mean between 3.3–14.9% $CO_2$ therein over a period of up to at least one week during storage at a temperature below room temperature but above 32° F.

2. The method as claimed in claim 1 wherein the food is one or more tomatoes, the sealing is done within about 2 days after the onset of the climacteric rise in respiration and the enclosed $O_2$ at the time of sealing is of the order of 33 cc. of $O_2$ per kilogram of enclosed tomatoes and the internal surface area of said collapsed permeable material is of the order of 1 square inch per 0.0044 kilogram of enclosed tomatoes and said material is a polyethylene film having a permeability to $O_2$ of the order of 2848 cc. and to $CO_2$ of the order of 4195 cc., both per mil per 100 square inches per 24 hours at STP, and having a thickness from about 75 to 130 gauge, and the storage temperature is about 58°–60° F., to maintain within said enclosure after said 6 hours an $O_2$ content around a mean between 4.4–6.7% and a $CO_2$ content around a mean between 3.3–4.5% for a period up to at least 3 weeks.

3. The method as claimed in claim 1 wherein the food is melons, and the enclosed $O_2$ at the time of sealing is of the order of 14 cc. of $O_2$ per kilogram of enclosed melon and the internal surface area of said collapsed permeable material is of the order of 1 square inch per 0.004 kilogram of enclosed melon and said material is a polyethylene film having a permeability to $O_2$ of the order of 2848 cc. and to $CO_2$ of the order of 4195 cc., both per mil per 100 square inches per 24 hours at STP, and having a thickness from about 150 to 250 gauge and the storage temperature is about 45° F., to maintain within said enclosure after said 6 hours an $O_2$ content around a mean between 2.8–3.9% and a $CO_2$ content around a mean between 8.8–14.9% for a period up to at least 5 weeks.

4. The method as claimed in claim 1 wherein the food is cherries, and the enclosed $O_2$ at the time of sealing is of the order of 82 cc. of $O_2$ per kilogram of enclosed cherries and the internal surface area of said collapsed pemeable material is of the order of 1 square inch per 0.006 kilogram of enclosed cherries and said material is a polyethylene film having a permeability to $O_2$ of the order of 2848 cc. and to $CO_2$ of the order of 4195 cc., both per mil per 100 square inches per 24 hours at STP, and having a thickness from about 75 to 300 gauge and the storage temperature is about 32° F., to maintain within said enclosure after said 6 hours an $O_2$ content around a mean between 3.5–10.0% and a $CO_2$ content around a mean between 3.7–8.7% for a period up to at least 5 weeks.

5. The method as claimed in claim 1 wherein the food is blueberries, and the enclosed $O_2$ at the time of sealing is of the order of 63 cc. of $O_2$ per kilogram of enclosed blueberries and the internal surface area of said collapsed permeable material is of the order of 1 square inch per 0.004 kilogram of enclosed blueberries and said material is a polyethylene film having a permeability to $O_2$ of the order of 2848 cc. and to $CO_2$ of the order of 4195 cc., both per mil per 100 square inches per 24 hours at STP, and having a thickness from about 150 to 300 gauge and the storage temperature is about 32° F., to maintain within said enclosure after said 6 hours an $O_2$ content around a mean between 4.6–8.8% and a $CO_2$ content around a mean between 3.4–6.0% for a period up to at least 7–8 weeks.

6. The method as claimed in claim 1 wherein the food is papaya, and the enclosed $O_2$ at the time of sealing is of the order of 12.5 cc. of $O_2$ per kilogram of enclosed papaya and the internal surface area of said collapsed permeable material is of the order of 1 square inch per 0.006 kilogram of enclosed papaya and said material is a polyethylene film having a permeability to $O_2$ of the order of 2848 cc. and to $CO_2$ of the order of 4195 cc., both per mil per 100 square inches per 24 hours at STP, and having a thickness from about 150 to 250 gauge and the storage temperature is about 45 to 60° F., to maintain within said enclosure after said 6 hours an $O_2$ content around a mean between 2.1–5.2% and a $CO_2$ content around a mean between 5.0–9.8% for a period up to at least 2 weeks.

7. The method as claimed in claim 1 wherein the food is peaches, and the enclosed $O_2$ at the time of sealing is of the order of 48 cc. of $O_2$ per kilogram of enclosed peaches and the internal surface area of said collapsed permeable material is of the order of 1 square inch per 0.004 kilogram of enclosed peaches and said material is a polyethylene film having a permeability to $O_2$ of the order of 2848 cc. and to $CO_2$ of the order of 4195 cc., both per mil per 100 square inches per 24 hours at STP, and having a thickness from about 150 to 250 gauge and the storage temperature is about 32° F., to maintain within said enclosure after said 6 hours an $O_2$ content around a mean between 2.0–4.7% and a $CO_2$ content around a mean between 5.8–9.0% for a period up to at least 6 weeks.

8. The method as claimed in claim 1 wherein the food is nectarines, and the enclosed $O_2$ at the time of sealing is of the order of 48 cc. of $O_2$ per kilogram of enclosed nectarines and the internal surface area of said collapsed permeable material is of the order of 1 square inch per 0.004 kilogram of enclosed nectarines and said material is a polyethylene film having a permeability to $O_2$ of the order of 2848 cc. and to $CO_2$ of the order of 4195 cc., both per mil per 100 square inches per 24 hours at STP, and having a thickness from about 100 to 250 gauge and the storage temperature is about 32° F., to maintain within said enclosure after said 6 hours an $O_2$ content around a mean between 3.7–6.6% and a $CO_2$ content around a mean between 4.1–6.8% for a period up to at least 6 weeks.

9. The method as claimed in claim 1 wherein the food is plums, and the enclosed $O_2$ at the time of sealing is of the order of 40 cc. of $O_2$ per kilogram of enclosed plums and the internal surface area of said collapsed permeable material is of the order of 1 square inch per 0.003 kilogram of enclosed plums and said material is a polyethylene film having a permeability to $O_2$ of the order of 2848 cc. and to $CO_2$ of the order of 4195 cc., both per mil per 100 square inches per 24 hours at STP, and having a thickness from about 200 to 300 gauge and the storage temperature is about 32° F., to maintain within said enclosure after said 6 hours an $O_2$ content around a mean between 5.4–8.0% and a $CO_2$ content around a mean between 4.3–6.5% for a period up to at least 5 weeks.

10. The method as claimed in claim 1 wherein the food is mangos, and the enclosed $O_2$ at the time of sealing is of the order of 70 cc. of $O_2$ per kilogram of enclosed mangos and the internal surface area of said collapsed permeable material is of the order of 1 square inch per 0.006 kilogram of enclosed mangos and said material is a polyethylene film having a permeability to $O_2$ of the order of 2848 cc. and to $CO_2$ of the order of 4195 cc., both per mil per 100 square inches per 24 hours at STP, and having a thickness from about 80 to 130 gauge and the storage temperature is about 50° F., to maintain within said enclosure after said 6 hours an $O_2$ content around a mean between 2.8–3.5% and a $CO_2$ content around a mean between 9.3–14.4% for a period up to at least 4 weeks.

11. The method as claimed in claim 1 wherein the food is ripe bananas, the sealing is done near the peak of the climacteric rise in respiration and the enclosed $O_2$ at the time of sealing is of the order of 52 cc. of $O_2$ per kilogram of enclosed ripe bananas and the internal surface area of said collapsed permeable material is of the order of 1 square inch per 0.008 kilogram of enclosed ripe bananas and said material is a polyethylene film having a permeability to $O_2$ of the order of 2848 cc. and to $CO_2$ of the order of 4195 cc., both per mil per 100 square inches per 24 hours at STP, and having a thickness from about 50 to 75 gauge and the storage temperature is about 70° F., to maintain within said enclosure after said 6 hours an $O_2$ content between 1.4–2.4% and a $CO_2$ content between 8.0–12.0% for a period up to at least 8 days.

References Cited

UNITED STATES PATENTS 2,571,340  10/1951  Carson _____ 99—171
2,611,709  9/1952  Plagge _____ 99—171

OTHER REFERENCES

Davis, Paper Trade Journal, 123, No. 9, pp. 33, 37–39, Aug. 29, 1946.

Gerhardt et al.: Modern Packaging, pp. 163–165, June 1948.

Landrock et al.: TAPPI, 35, 241–246, June 1952.

RAYMOND N. JONES, *Primary Examiner.*

PO-1050
(5/69)

UNITED STATES PATENT OFFICE
CERTIFICATE OF CORRECTION

Patent No. 3,450,544          Dated June 17, 1969

Inventor(s) Adnan M. Badran et al.

It is certified that error appears in the above-identified patent and that said Letters Patent are hereby corrected as shown below:

Column 2, line 67, change "undesirble" to --undesirable--. Column 9, in the table for Example IV - Blueberries, change mean $O_2$ content for 250 gauge film from "6.9" to --6.7--; in the table for Example IV - Blueberries, change mean $O_2$ content for 300 gauge film from "4.7" to --4.6--; line 65, after "an" insert --unmarketable condition. These were compared to con- --. Column 10, in the table for Example VI - Peaches, change mean $O_2$ content for 100 gauge film from "4.3" to --3.3--; in the table for Example VI - Peaches, change mean $O_2$ content for 130 gauge film from "3.0" to --4.0--. Column 14, line 46, change "senescene" to --senescence--; line 66, change "encloure" to --enclosure--. Column 15, line 33, change "pemeable" to -- permeable--.

SIGNED AND
SEALED

MAR 17 1970

(SEAL)
Attest:

Edward M. Fletcher, Jr.
Attesting Officer

WILLIAM E. SCHUYLER, JR.
Commissioner of Patents